United States Patent
Inoue

(10) Patent No.: US 9,651,940 B2
(45) Date of Patent: May 16, 2017

(54) NUMERICAL CONTROL DEVICE

(71) Applicant: FANUC Corporation, Minamitsuru-gun, Yamanashi (JP)

(72) Inventor: Shogo Inoue, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 303 days.

(21) Appl. No.: 14/602,315

(22) Filed: Jan. 22, 2015

(65) Prior Publication Data
US 2015/0212513 A1   Jul. 30, 2015

(30) Foreign Application Priority Data

Jan. 24, 2014   (JP) .................................. 2014-011678

(51) Int. Cl.
| G05B 15/00 | (2006.01) |
| G06F 19/00 | (2011.01) |
| G05B 19/408 | (2006.01) |
| H04L 29/08 | (2006.01) |
| H04L 29/06 | (2006.01) |

(52) U.S. Cl.
CPC ........ *G05B 19/408* (2013.01); *H04L 63/0428* (2013.01); *H04L 67/10* (2013.01)

(58) Field of Classification Search
None
See application file for complete search history.

(56) References Cited

U.S. PATENT DOCUMENTS

| 2008/0031448 A1 | 2/2008 | Dang et al. |
| 2008/0294910 A1* | 11/2008 | Lin ......................... G06F 21/10 |
| | | 713/190 |
| 2010/0153741 A1* | 6/2010 | Liang .................... H04L 9/0631 |
| | | 713/189 |
| 2010/0208283 A1 | 8/2010 | Mori et al. |

FOREIGN PATENT DOCUMENTS

| CN | 101094057 A | 12/2007 |
| CN | 101101616 A | 1/2008 |
| CN | 102043394 A | 5/2011 |
| CN | 103384268 A | 11/2013 |

(Continued)

OTHER PUBLICATIONS

The Notification of First Office Action issued Nov. 21, 2016 in Chinese Patent Application No. 201510034279X (9 pages) with an English Translation (15 pages).

(Continued)

*Primary Examiner* — Adam Lee
(74) *Attorney, Agent, or Firm* — Drinker Biddle & Reath LLP

(57) ABSTRACT

A numerical control device for controlling a machine tool while sequentially reading out an NC program from a host computer includes an external program invoking unit configured to invoke an encrypted NC program, a communication setting information storing unit configured to store setting information for communicating with the host computer, an NC program acquisition determining unit, an encrypted NC program acquisition request transmitting unit, an encrypted NC program decrypting unit, and an NC program display prohibiting unit.

8 Claims, 14 Drawing Sheets

(56) References Cited

FOREIGN PATENT DOCUMENTS

| | | |
|---|---|---|
| JP | H04-184506 A | 7/1992 |
| JP | 2003-195930 A | 7/2003 |
| JP | 2005-038294 A | 2/2005 |
| JP | 2008-269030 A | 11/2008 |
| JP | 2013-200893 A | 10/2013 |

OTHER PUBLICATIONS

Notification of Reasons for Refusal issued Jun. 30, 2015 in Japanese Patent Application No. 2014-011678 (3 pages) with English translation (3 pages).

* cited by examiner

```
COMMAND FORM  ###
   M198 Pxxxx Amm
   M198 <yyyy> Amm

M198      EXTERNAL PROGRAM INVOCATION COMMAND
   Pxxxx     PROGRAM NUMBER
   <yyyy>    FILE NAME
   Amm       CONNECTION DESTINATION NUMBER  (1~99)
```

FIG. 10

INCORPORATED ETHERNET HOST FILE LIST

O8000 N00000

DNC OPERATION FILE  O1984  :1

EFFECTIVE DEVICE  BUILT-IN PORT

NUMBER OF REGISTERED PROGRAMS  29

DEVICE: EMB_ETHER (CURRENT FOLDER:/)
O1000
O1980
O1982
O1983
O1984
O2000
O2001
O2002
O3000a
O3001
O3001a
PrgN32
PrgN33

A>^

RMT ... ... ...

| PROGRAM | LIST | NEXT BLOCK | CHECK | (OPERATION) PATH1 | + |

FIG. 11

```
        ###  SETTING INFORMATION  ###

CONNECTION DESTINATION NUMBER      1
PROTOCOL                           ftp
USER INFORMATION                   username : password
HOST NAME                          101. 102. 103. 104
PORT NUMBER                        21
PATH                               /NcProgram/
FILE ATTRIBUTE                     COMPRESSED
FILE INFORMATION                   password CONNECTION DESTINATION NUMBER      2
PROTOCOL                           http
USER INFORMATION                   username : password
HOST NAME                          example. jp
PORT NUMBER                        80
PATH                               /NcProgram/
FILE ATTRIBUTE                     ENCRYPTED
FILE INFORMATION                   DECRYPTION KEY
```

FIG. 12

```
%
O1234 ;
    :
    :
M198 P1984 A1 ;
M198 <WORK6666.prg> A2 ;
    :
    :
M30 ;
%
```

NUMERICAL CONTROL DEVICE

RELATED APPLICATION DATA

This application claims priority under 35 U.S.C. §119 and/or §365 to Japanese Application No. 2014-011678 filed Jan. 24, 2014, the entire contents is incorporated herein by reference.

BACKGROUND OF THE INVENTION

1. Field of the Invention

The present invention relates to a numerical control device that controls a machine tool and, more particularly, to a numerical control device that can invoke an external program.

2. Description of the Related Art

A machine tool manufacturer often stores an NC program specialized for a machine tool in a numerical control device, which controls the machine tool, and delivers the machine tool to an end user. The NC program specialized for the machine tool is contrived to make the best of functions and performance of the machine tool and is an intellectual property of the machine tool manufacturer.

In order to prevent the NC program specialized for the machine tool from being leaked to other machine tool manufacturers and end users, the numerical control device includes a function of preventing the NC program from being displayed on a display of the numerical control device, prohibiting editing of the NC program, and prohibiting an output of the NC program from the numerical control device to an external apparatus.

As a prior art, there has been disclosed a technique in which a numerical control device including an IC card reader can limit operation of the numerical control device based on ID information read out from the IC card reader and prohibit an output of an NC program (see Japanese Patent Application Laid-Open No. H4-184506).

A numerical control device connected to a network line includes a function of operating a machine tool while sequentially reading out an NC program stored in a host computer connected to the network line. This operation is called DNC operation.

As a prior art, there has been disclosed a technique in which a host computer transmits a plurality of NC data and schedule data created by the host computer to a control computer integrally provided in a machine tool and the control computer transmits the NC data to a numerical control device according to the schedule data to perform DNC operation (see Japanese Patent Application Laid-Open No. 2003-195930).

After shipping the machine tool to an end user, when the machine tool manufacturer provides the end user with an NC program specialized for the machine tool created by the machine tool manufacturer anew, the machine tool manufacturer has to visit the end user and store the NC program specialized for the machine tool created anew in the numerical control device.

In order to eliminate the labor and time, a DNC system is conceivable in which an NC program specialized for a machine tool is stored in a host computer, which is managed by a machine tool manufacturer, as an external program and a numerical control device connected to a network line invokes the NC program specialized for the machine tool from the host computer as the external program and executes DNC operation. However, this method has problem described below.

1. If the NC program is stolen from the network line, contents of the NC program are easily analyzed and illegally reused.
2. Since contents of the NC program running under the DNC operation is displayed on a display of the numerical control device, contents of the NC program are easily analyzed and illegally reused.

SUMMARY OF THE INVENTION

Therefore, in view of the problems of the related art, it is an object of the present invention to provide a numerical control device that is capable of preventing an NC program from being illegally reused and controls a machine tool while sequentially reading out the NC program from a host computer via a network line.

A numerical control device according to the present invention is a numerical control device configured to control a machine tool while sequentially reading out an NC program from a host computer via a network line. The numerical control device includes: an external program invoking unit configured to invoke an encrypted NC program as an external program; a communication setting information storing unit configured to store setting information for communicating with the host computer; an NC program acquisition determining unit configured to determine, on the basis of the setting information stored in the communication setting information storing unit, whether the encrypted NC program needs to be acquired; an encrypted NC program acquisition request transmitting unit configured to transmit an acquisition request for the encrypted NC program to the host computer; an encrypted NC program decrypting unit configured to decrypt the encrypted NC program received from the host computer; and an NC program display prohibiting unit configured to prohibit display of the encrypted NC program.

A numerical control device according to the present invention is a numerical control device configured to control a machine tool while sequentially reading out an NC program from a host computer via a network line. The numerical control device includes: an external program invoking unit configured to invoke an encrypted NC program and an unencrypted NC program as an external program; a communication setting information storing unit configured to store setting information for communicating with the host computer; an NC program acquisition determining unit configured to determine, on the basis of the setting information stored in the communication setting information storing unit, which one of the encrypted NC program and the unencrypted NC program needs to be acquired; an encrypted NC program acquisition request transmitting unit configured to transmit, when the NC program acquisition determining unit determines that the encrypted NC program needs to be acquired, an acquisition request for the encrypted NC program to the host computer; an NC program acquisition request transmitting unit configured to transmit, when the NC program acquisition determining unit determines that the unencrypted NC program needs to be acquired, an acquisition request for the unencrypted NC program to the host computer; an NC program decryption determining unit configured to determine whether the NC program received from the host computer is the encrypted NC program; an encrypted NC program decrypting unit configured to decrypt the NC program determined by the NC program decryption determining unit as being the encrypted NC program; an NC program display determining unit configured to determine whether the encrypted NC program is displayed on an NC program display unit; and an NC program display prohibiting unit configured to prohibit display of the encrypted NC program.

The setting information stored in the communication setting information storing unit may include all or a part of a protocol, user information, a host name, a port number, a path, a file attribute indicating whether a file needs to be encrypted, and file information indicating a key necessary for decrypting the encrypted NC program.

A numerical control device according to the present invention is a numerical control device configured to control a machine tool while sequentially reading out an NC program from a host computer via a network line. The numerical control device includes: an external program invoking unit configured to invoke a NC program compressed with a password as an external program; a communication setting information storing unit configured to store setting information for communicating with the host computer; an NC program acquisition determining unit configured to determine, on the basis of the setting information stored in the communication setting information storing unit, whether the NC program compressed with the password needs to be acquired; a compressed NC program acquisition request transmitting unit configured to transmit to the host computer an acquisition request for the NC program compressed with the password; a compressed NC program decompressing unit configured to decompress the NC program compressed with the password received from the host computer; and an NC program display prohibiting unit configured to prohibit display of the NC program compressed with the password.

A numerical control device according to the present invention is a numerical control device configured to control a machine tool while sequentially reading out an NC program from a host computer via a network line. The numerical control device includes: an external program invoking unit configured to invoke an NC program compressed with a password and an uncompressed NC program as an external program; a communication setting information storing unit configured to store setting information for communicating with the host computer; an NC program acquisition determining unit configured to determine, on the basis of the setting information stored in the communication setting information storing unit, which one of the NC program compressed with the password and the uncompressed NC program needs to be acquired; a compressed NC program acquisition request transmitting unit configured to transmit, when the NC program acquisition determining unit determines that the NC program compressed with the password needs to be acquired, an acquisition request for the NC program compressed with the password to the host computer; an NC program acquisition request transmitting unit configured to transmit, when the NC program acquisition determining unit determines that the uncompressed NC program needs to be acquired, an acquisition request for the uncompressed NC program to the host computer; an NC program decompression determining unit configured to determine whether the NC program received from the host computer is the NC program compressed with the password; a compressed NC program decompressing unit configured to decompress the NC program compressed with the password determined by the NC program decompression determining unit as being the NC program compressed with the password; an NC program display determining unit configured to determine whether the NC program compressed with the password is displayed on an NC program display unit; and an NC program display prohibiting unit configured to prohibit display of the NC program compressed with the password.

The setting information stored in the communication setting information storing unit may include all or a part of the protocol, the user information, the host name, the port number, the path, the file attribute indicating whether a file needs to be compressed, and file information indicating the password necessary for decompressing the NC program compressed with the password.

Since the present invention includes the above configurations, it is possible to provide a numerical control device that is capable of preventing an NC program from being illegally reused and controls a machine tool while sequentially reading out the NC program from a host computer via a network line.

BRIEF DESCRIPTION OF THE DRAWINGS

The above and other objects and features of the present invention will be obvious from embodiments explained below with reference to the accompanying drawings. Among the drawings:

FIG. 10 is a diagram showing an example of external program invocation setting (a DNC operation file);

FIG. 11 is a diagram showing an example of setting information stored in a communication setting storing unit necessary for invoking an external program;

FIG. 12 is a diagram showing an example of an excerpt from an NC program including an external program invocation command;

DESCRIPTION OF THE PREFERRED EMBODIMENTS

Figure 1:
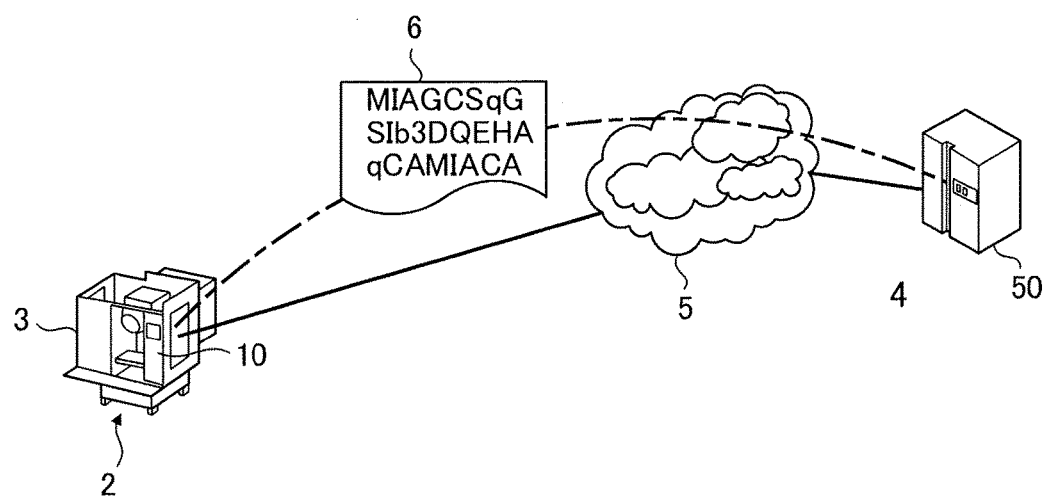
FIG. 1 is a diagram showing an example of a DNC system.

In the following explanation, the same reference numerals and signs are used for the same components and similar components in embodiments. User information includes a user name and a password. A host name includes a domain name that can be resolved by a domain name system (DNS), that is, a domain name from which an IP address corresponding to the domain name can be derived, or an IP address. A path includes a hierarchy of a file system.

First Embodiment

FIG. 1 is a diagram showing a DNC system according to an embodiment. A first aspect of the present invention is a DNC system including a numerical control device 10 and a host computer 50 connected to a network line such as the Internet 5. A machine tool 3 of an end user 2 is controlled by the numerical control device 10. The numerical control device 10 is connected to the host computer 50 of a machine tool manufacturer 4 via the Internet 5. The numerical control device 10 receives an encrypted NC program 6 from the host computer 50 via the Internet 5. Note that the numerical control device 10 and the host computer 50 are explained below with reference to FIGS. 3 to 8.

As explained above, the numerical control device 10, which controls the machine tool 3 of the end user 2, operates the machine tool 3 while sequentially reading out via the Internet the encrypted NC program 6 from the host computer 50 of the machine tool manufacturer 4. The numerical control device 10 usually includes a processor (CPU), a memory, and a communication interface.

When the numerical control device 10 executes DNC operation by external program invocation, the numerical control device 10 connects a communication unit 30 of the numerical control device 10 to the host computer 50 using all or a part of a protocol, a host name, a port number, and user information recorded in setting information associated with a connection destination number designated by an argument of an external program invocation command or a connection destination number designated by an argument of external program invocation setting. The numerical control device 10 requests the host computer 50 that the numerical control device 10 can acquire the encrypted NC program 6. The numerical control device 10 receives the encrypted NC program 6 from the host computer 50, decrypts the encrypted NC program 6, and executes the DNC operation in a numerical control unit 20 of the numerical control device 10. However, the numerical control device 10 does not display the encrypted NC program 6.

Second Embodiment

Figure 2:
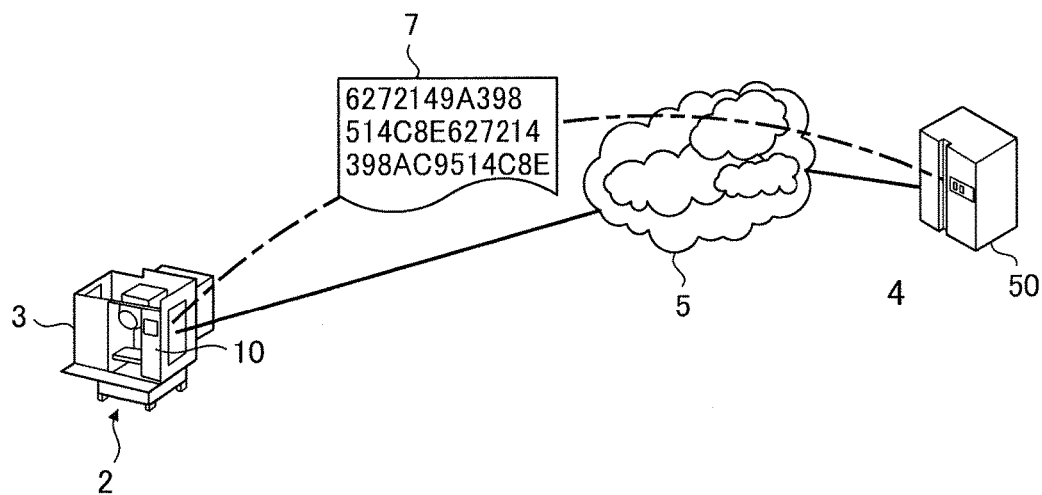
FIG. 2 is a diagram showing an example of a DNC system.

FIG. 2 is a diagram showing an example of a DNC system according to a second embodiment. A second aspect of the present invention is a DNC system including the numerical control device 10 and the host computer 50 connected to a network line such as the Internet 5. When the numerical control device 10 executes DNC operation by external program invocation, the numerical control device 10 connects the communication unit 30 of the numerical control device 10 to the host computer 50 using all or a part of a protocol, a host name, a port number, and user information recorded in setting information associated with a connection destination number designated by an argument of an external program invocation command or a connection destination number designated by an argument of external program invocation setting. The numerical control device 10 requests the host computer 50 that the numerical control device 10 can acquire an NC program 7 compressed with a password. The numerical control device 10 receives the NC program 7 compressed with the password from the host computer 50, decompresses the NC program 7 compressed with the password, and executes the DNC operation in the numerical control unit 20 of the numerical control device 10. However, the numerical control device 10 does not display the NC program 7 compressed with the password.

As explained above, with the system configurations in the first embodiment and the second embodiment, there is no concern that an NC program specialized for a machine tool, which is an intellectual property of a machine tool manufacturer, is illegally reused. Therefore, the numerical control device 10 can acquire, besides an NC program specialized for a machine tool stored in the numerical control device 10 in advance, an NC program specialized for the machine tool created anew by the machine tool manufacturer 4 from the host computer 50 of the machine tool manufacturer 4 via a network line such as the Internet 5 and perform the DNC operation. As a result, the machine tool manufacturer 4 does not have to visit the end user 2 and store the NC program specialized for the machine tool created anew in the numerical control device 10 that controls the machine tool 3 of the end user 2. The machine tool manufacturer 4 can easily provide the end user 2, who uses the machine tool 3, with the NC program specialized for the machine tool.

In this way, it is unnecessary to store the NC program protected as the intellectual property in the numerical control device 10 in advance. Therefore, the machine tool manufacturer 4 can easily establish, in the host computer 50 of the machine tool manufacturer 4, mechanisms such as sales and lease of the NC program. The end user 2 can properly use the NC program protected as the intellectual property and a normal NC program according to necessity.

Further, since the NC program is encrypted (see FIG. 1) or compressed with the password (see FIG. 2), even if the NC program does not need to be protected as an intellectual property, it is guaranteed that contents of the NC program delivered via a network line such as the Internet 5 from the separated host computer 50 are not falsified. Therefore, the end user 2 can execute the DNC operation with security.

The internal configuration of the numerical control device is explained below.

Figure 3:
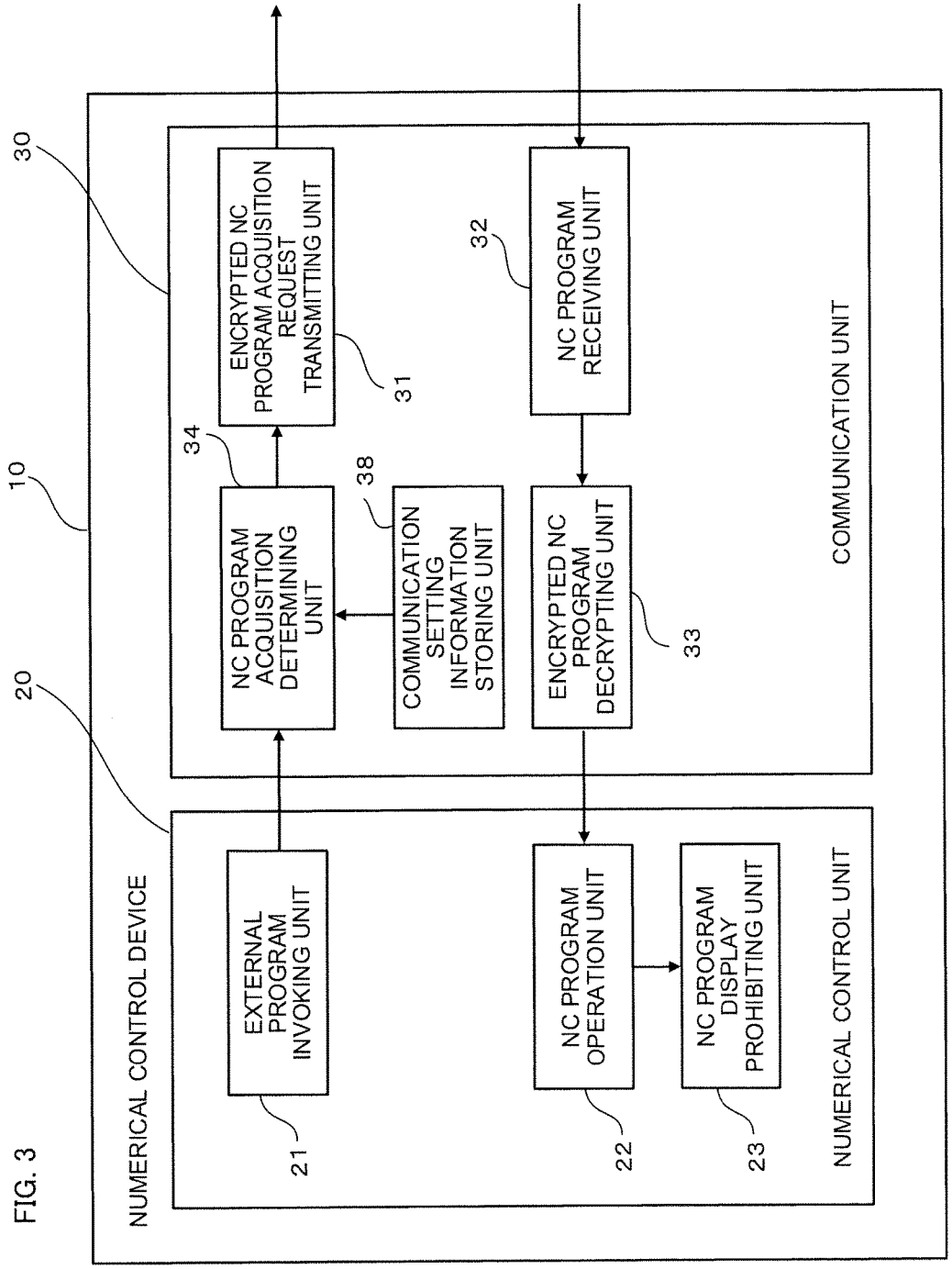
FIG. 3 is a diagram showing the internal configuration of a numerical control device.

FIG. 3 is a diagram showing an example of the internal configuration of the numerical control device. The numerical control device 10 includes the numerical control unit 20 and the communication unit 30. The numerical control unit 20 includes an external program invoking unit 21, an NC program operation unit 22, and an NC program display prohibiting unit 23. The communication unit 30 includes an encrypted NC program acquisition request transmitting unit 31, an NC program receiving unit 32, an encrypted NC program decrypting unit 33, an NC program acquisition determining unit 34, and a communication setting information storing unit 38.

The external program invoking unit 21 passes a command for invoking the encrypted NC program 6 as an external program to the NC program acquisition determining unit 34. The NC program acquisition determining unit 34 passes, on the basis of communication setting information stored in the communication setting information storing unit 38, to the encrypted NC program acquisition request transmitting unit 31, a command for requesting the host computer 50 to transmit the encrypted NC program 6 to the numerical control device 10.

The encrypted NC program acquisition request transmitting unit 31 requests the host computer 50 to transmit the encrypted NC program 6 to the numerical control device 10.

The NC program receiving unit 32 receives the encrypted NC program 6 transmitted from the host computer 50 and passes the received encrypted NC program 6 to the encrypted NC program decrypting unit 33. The encrypted NC program decrypting unit 33 decrypts the encrypted NC program 6 and passes a decrypted NC program to the NC program operation unit 22.

The NC program operation unit 22 executes the NC program decrypted by the encrypted NC program decrypting unit 33 and controls the machine tool 3 of the end user 2. When the machine tool 3 is controlled by the encrypted NC program 6, the NC program operation unit 22 commands the NC program display prohibiting unit 23 to prevent the decrypted NC program from being displayed on a display screen of a display device included in the numerical control device 10.

Figure 4:
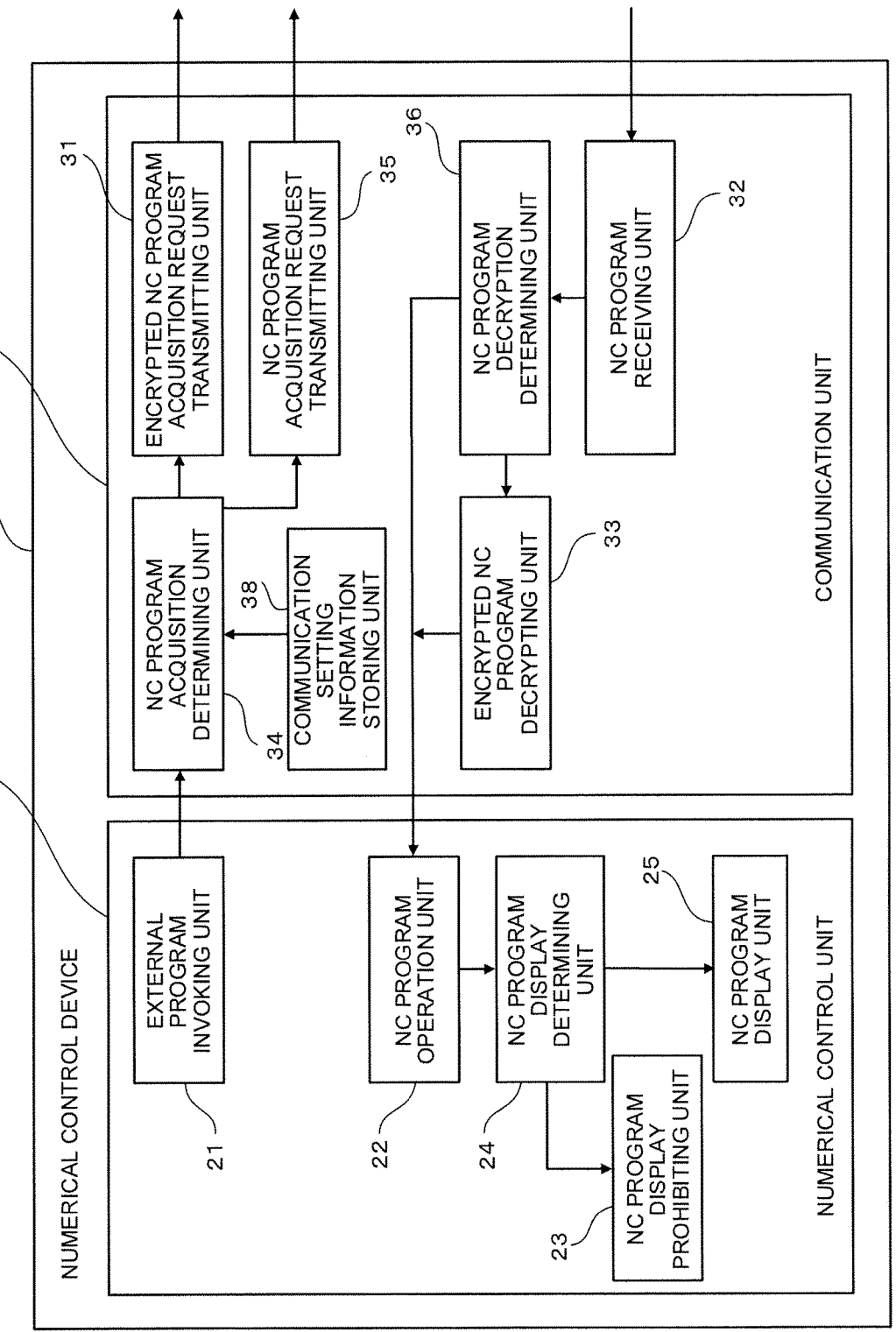
FIG. 4 is a diagram showing the internal configuration of the numerical control device.

FIG. 4 is a diagram showing an example of the internal configuration of the numerical control device. The numerical control device 10 includes the numerical control unit 20 and the communication unit 30. The numerical control unit 20 includes the external program invoking unit 21, the NC program operation unit 22, the NC program display prohibiting unit 23, an NC program display determining unit 24, and an NC program display unit 25. The communication unit 30 includes the encrypted NC program acquisition request transmitting unit 31, the NC program receiving unit 32, the encrypted NC program decrypting unit 33, the NC program acquisition determining unit 34, an NC program acquisition request transmitting unit 35, an NC program decryption determining unit 36, and the communication setting information storing unit 38.

The external program invoking unit 21 passes a command for invoking the encrypted NC program 6 and an unencrypted NC program as an external program to the NC program acquisition determining unit 34. The NC program acquisition determining unit 34 passes, on the basis of communication setting information stored in the communication setting information storing unit 38, when determining that the encrypted NC program 6 is invoked, to the encrypted NC program acquisition request transmitting unit 31, a command for requesting the host computer 50 to transmit the encrypted NC program 6 to the numerical control device 10 and passes, when determining that the unencrypted NC program is invoked, to the NC program acquisition request transmitting unit 35, a command for requesting the host computer 50 to transmit the unencrypted NC program to the numerical control device 10.

The encrypted NC program acquisition request transmitting unit 31 requests the host computer 50 to transmit the encrypted NC program 6 to the numerical control device 10. The NC program acquisition request transmitting unit 35 requests the host computer 50 to transmit the unencrypted NC program to the numerical control device 10.

The NC program receiving unit 32 receives the NC program transmitted from the host computer 50 and passes the received NC program to the NC program decryption determining unit 36. The NC program decryption determining unit 36 determines whether the NC program received from the host computer 50 is the encrypted NC program 6. When determining that the received NC program is the encrypted NC program 6, the NC program decryption determining unit 36 passes the encrypted NC program 6 to the encrypted NC program decrypting unit 33. Otherwise, the NC program decryption determining unit 36 passes the unencrypted NC program to the NC program operation unit 22. The encrypted NC program decrypting unit 33 decrypts the encrypted NC program 6 and passes a decrypted NC program to the NC program operation unit 22.

The NC program operation unit 22 executes the NC program and controls the machine tool 3 of the end user 2. The NC program operation unit 22 passes the NC program to the NC program display determining unit 24. The NC program display determining unit 24 determines whether an attribute of a file of the NC program is "encrypted". When the attribute of the file is "encrypted", the NC program display determining unit 24 passes the encrypted NC program 6 to the NC program display prohibiting unit 23. When the attribute of the file is not "encrypted", the NC program display determining unit 24 passes the unencrypted NC program to the NC program display unit 25. The NC program display determining unit 24 commands the NC program display prohibiting unit 23 to prevent the decrypted NC program from being displayed on a display screen of a display device included in the numerical control device 10. The NC program display unit 25 displays the unencrypted NC program on the display screen of the display device included in the numerical control device 10.

Figure 5:
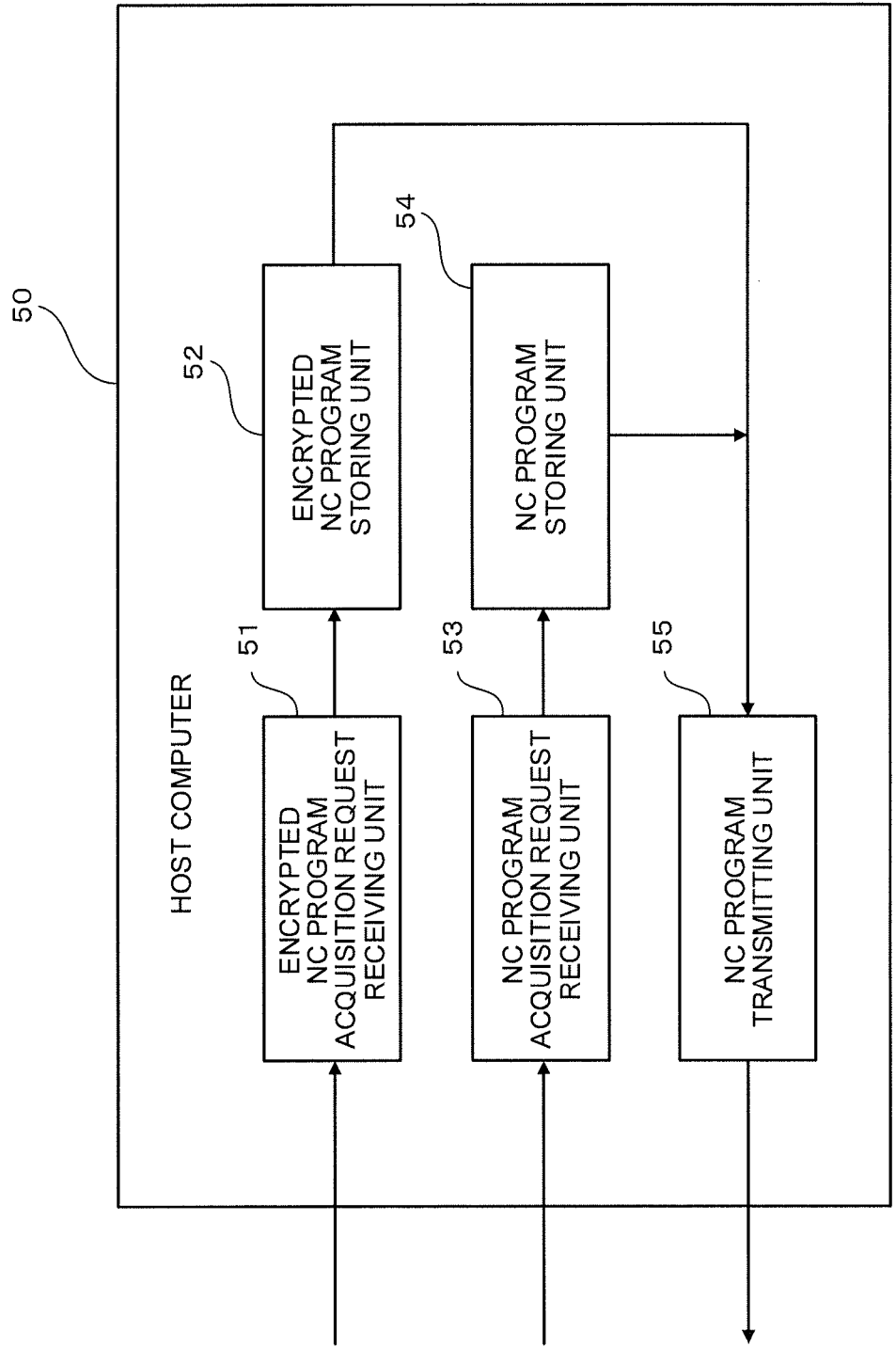
FIG. 5 is a diagram showing the internal configuration of a host computer.

FIG. 5 is a diagram showing an example of the internal configuration of the host computer. The host computer 50 includes an encrypted NC program acquisition request receiving unit 51, an encrypted NC program storing unit 52, an NC program acquisition request receiving unit 53, an NC program storing unit 54, and an NC program transmitting unit 55.

The host computer 50 receives, in the encrypted NC program acquisition request receiving unit 51, an acquisition request for the encrypted NC program 6 from the numerical control device 10 and receives, in the NC program acquisition request receiving unit 53, an acquisition request for the unencrypted NC program from the numerical control device 10. The encrypted NC program acquisition request receiving unit 51 commands the encrypted NC program storing unit 52 to output the encrypted NC program 6 to the NC program transmitting unit 55. The NC program acquisition request receiving unit 53 commands the NC program storing unit to output the unencrypted NC program to the NC program transmitting unit 55. The NC program transmitting unit 55 transmits, to the numerical control device 10, the encrypted NC program 6 received from the encrypted NC program storing unit 52 or the unencrypted NC program received from the NC program storing unit 54.

Figure 6:
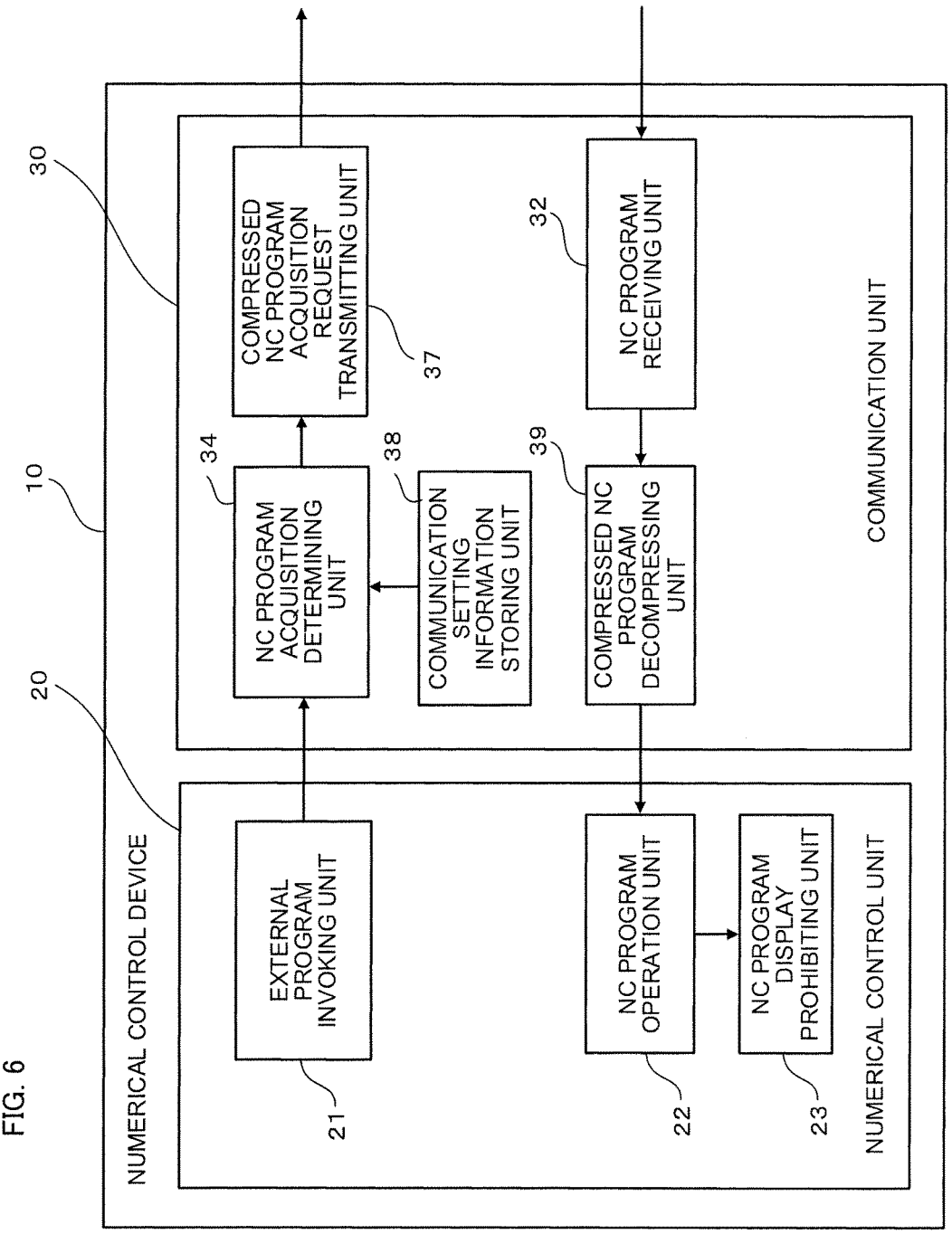
FIG. 6 is a diagram showing the internal configuration of the numerical control device.

FIG. 6 is a diagram showing an example of the internal configuration of the numerical control device. The numerical control device 10 includes the numerical control unit 20 and the communication unit 30. The numerical control unit 20 includes the external program invoking unit 21, the NC program operation unit 22, and the NC program display prohibiting unit 23. The communication unit 30 includes the NC program receiving unit 32, the NC program acquisition determining unit 34, a compressed NC program acquisition request transmitting unit 37, the communication setting information storing unit 38, and a compressed NC program decompressing unit 39.

The external program invoking unit 21 passes a command for invoking the NC program 7 compressed with the password as an external program to the NC program acquisition determining unit 34. The NC program acquisition determining unit 34 passes, on the basis of communication setting information stored in the communication setting information storing unit 38, to the compressed NC program acquisition request transmitting unit 37, a command for requesting the host computer 50 to transmit the NC program 7 compressed with the password to the numerical control device 10.

The compressed NC program acquisition request transmitting unit 37 requests the host computer 50 to transmit the NC program 7 compressed with the password to the numerical control device 10.

The NC program receiving unit 32 receives the NC program 7 compressed with the password transmitted from the host computer 50 and passes the received NC program 7 compressed with the password to the compressed NC program decompressing unit 39. The compressed NC program decompressing unit 39 decompresses the NC program 7 compressed with the password and passes the decompressed NC program to the NC program operation unit 22.

The NC program operation unit 22 executes the NC program decompressed by the compressed NC program decompressing unit 39 and controls the machine tool 3 of the end user 2. When the machine tool 3 is controlled according to the NC program 7 compressed with the password, the NC program operation unit 22 commands the NC program display prohibiting unit 23 to prevent the decompressed NC program from being displayed on the display screen of the display device included in the numerical control device 10.

Figure 7:
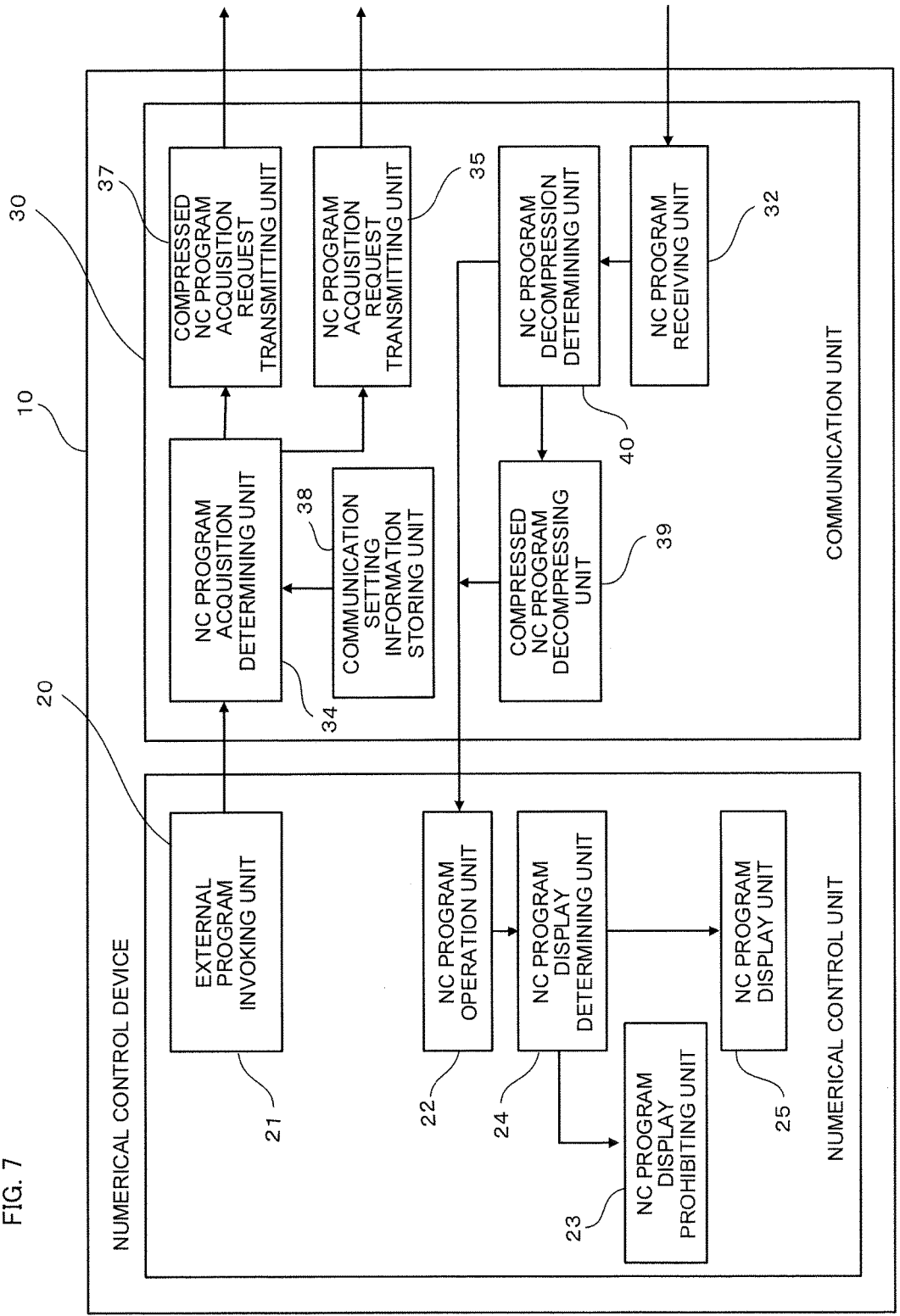
FIG. 7 is a diagram showing the internal configuration of the numerical control device.

FIG. 7 is a diagram showing an example of the internal configuration of the numerical control device. The numerical control device 10 includes the numerical control unit 20 and the communication unit 30. The numerical control unit 20 includes the external program invoking unit 21, the NC program operation unit 22, the NC program display prohibiting unit 23, an NC program display determining unit 24, and the NC program display unit 25. The communication unit 30 includes the NC program receiving unit 32, the NC program acquisition determining unit 34, the NC program acquisition request transmitting unit 35, a compressed NC program acquisition request transmitting unit 37, the communication setting information storing unit 38, the compressed NC program decompressing unit 39, and an NC program decompression determining unit 40.

The external program invoking unit 21 passes a command for invoking the NC program 7 compressed with the password and an uncompressed NC program as an external program to the NC program acquisition determining unit 34. The NC program acquisition determining unit 34 passes, on the basis of communication setting information stored in the communication setting information storing unit 38, when determining that the NC program 7 compressed with the password is invoked, to the compressed NC program acquisition request transmitting unit 37, a command for requesting the host computer 50 to transmit the NC program 7 compressed with the password to the numerical control device 10 and passes, when determining that the uncompressed NC program is invoked, to the NC program acquisition request transmitting unit 35, a command for requesting the host computer 50 to transmit the uncompressed NC program to the numerical control device 10.

The compressed NC program acquisition request transmitting unit 37 requests the host computer 50 to transmit the NC program 7 compressed with the password to the numerical control device 10. The NC program acquisition request transmitting unit 35 requests the host computer 50 to transmit the uncompressed NC program to the numerical control device 10.

The NC program receiving unit 32 receives the NC program transmitted from the host computer 50 and passes the received NC program to the NC program decompression determining unit 40. The NC program decompression determining unit 40 determines whether the NC program received from the host computer 50 is the NC program 7 compressed with the password. When determining that the received NC program is the NC program 7 compressed with the password, the NC program decompression determining unit 40 passes the NC program 7 compressed with the password to the compressed NC program decompressing unit 39. Otherwise, the NC program decompression determining unit 40 passes the uncompressed NC program to the NC program operation unit 22. The compressed NC program decompressing unit 39 decompresses the NC program 7 compressed with the password and passes a decompressed NC program to the NC program operation unit 22.

The NC program operation unit 22 executes the NC program and controls the machine tool 3 of the end user 2. The NC program operation unit 22 passes the NC program to the NC program display determining unit 24. The NC program display determining unit 24 determines whether an attribute of a file of the NC program is "compressed". When the attribute of the file is "compressed", the NC program display determining unit 24 passes the NC program 7 compressed with the password to the NC program display prohibiting unit 23. When the attribute of the file is not "compressed", the NC program display determining unit 24 passes the uncompressed NC program to the NC program display unit 25. The NC program display determining unit 24 commands the NC program display prohibiting unit 23 to prevent the decompressed NC program from being displayed on the display screen of the display device included in the numerical control device 10. The NC program display unit 25 displays the uncompressed NC program on the display screen of the display device included in the numerical control device 10.

Figures 8, 9:
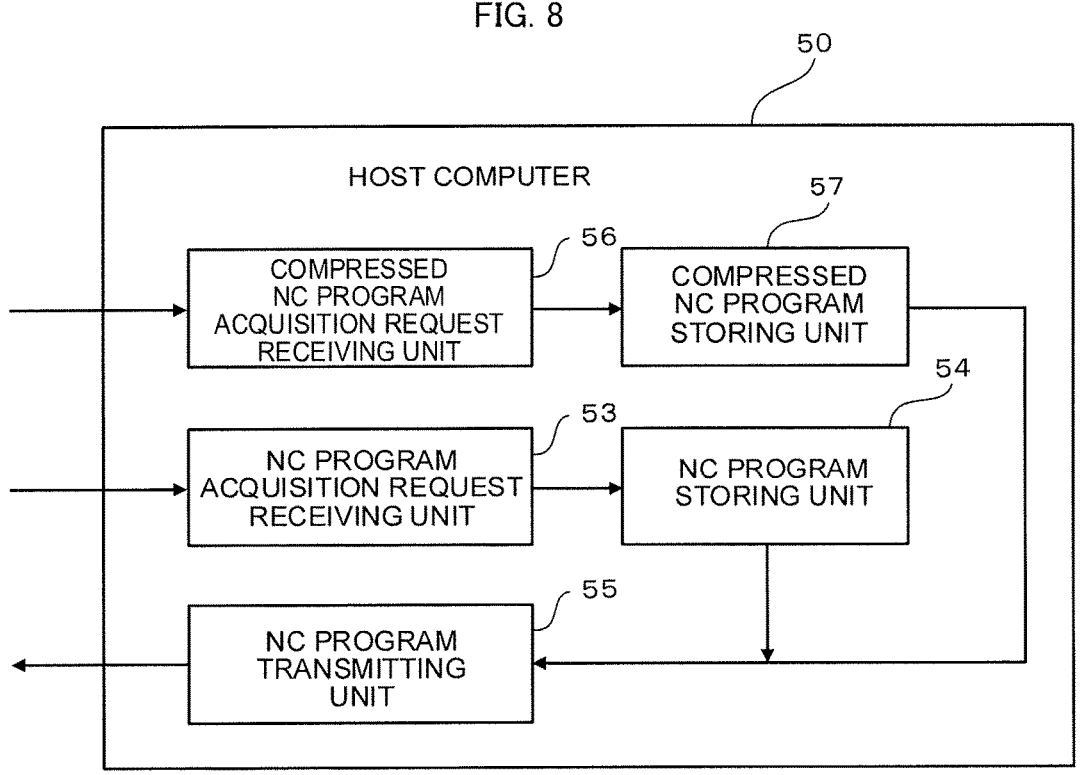
FIG. 8 is a diagram showing the internal configuration of the host computer.
FIG. 9 is a diagram showing an example of an external program invocation command.

FIG. 8 is a diagram showing an example of the internal configuration of the host computer.

The host computer 50 includes the NC program acquisition request receiving unit 53, the NC program storing unit 54, the NC program transmitting unit 55, a compressed NC program acquisition request receiving unit 56, and a compressed NC program storing unit 57.

The host computer 50 receives, in the compressed NC program acquisition request receiving unit 56, an acquisition request for the NC program 7 compressed with the password from the numerical control device 10 and receives, in the NC program acquisition request receiving unit 53, an acquisition request for the uncompressed NC program from the numerical control device 10. The compressed NC program acquisition request receiving unit 56 commands the compressed NC program storing unit 57 to output the NC program 7 compressed with the password to the NC program transmitting unit 55. The NC program acquisition request receiving unit 53 commands the NC program storing unit 54 to output the uncompressed NC program to the NC program transmitting unit 55. The NC program transmitting unit 55 transmits, to the numerical control device 10, the NC program compressed with the password received from the compressed NC program storing unit 57 or the uncompressed NC program received from the NC program storing unit 54.

FIG. 9 is a diagram showing an example of an external program invocation command. The external program invocation command is an example of a command form for invoking an external program from the external program invoking unit 21 to the NC program acquisition determining unit 34 shown in FIGS. 3, 4, 6, and 7.

FIG. 10 is a diagram showing an example of external program invocation setting (a DNC operation file). The DNC operation file can be displayed on the display screen of the display device included in the numerical control device 10. A file (an NC program) to be invoked as an external program can be designated.

FIG. 11 is a diagram showing an example of setting information stored in the communication setting information storing unit 38 necessary for invoking an external program.

FIG. 12 is a diagram showing an example of an excerpt from an NC program including the external program invocation command (see FIG. 9).

Figure 13:
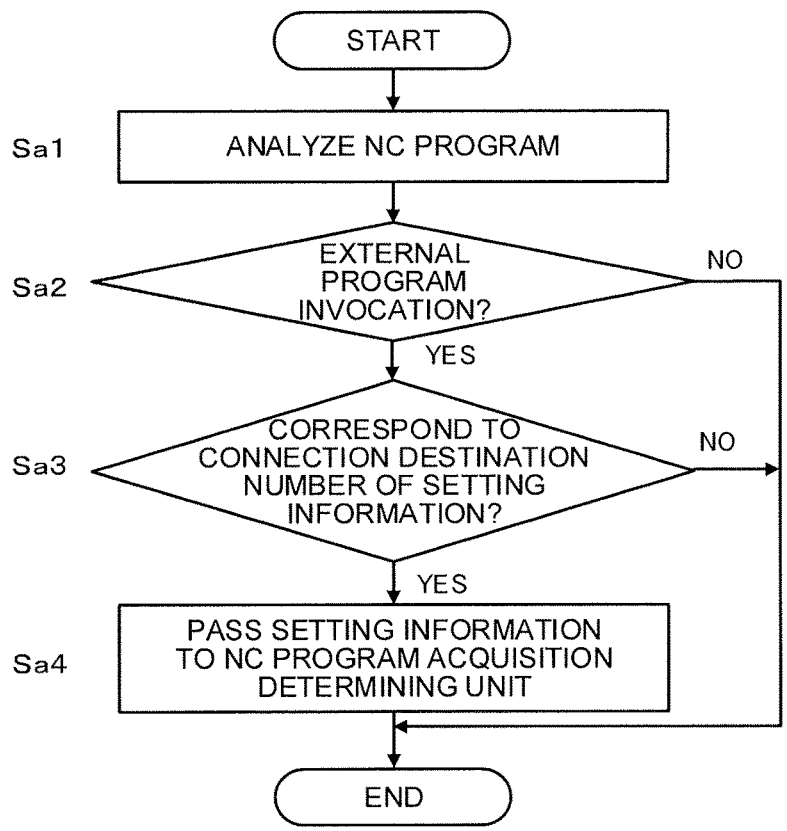
FIG. 13 is a diagram showing a sequence of an external program invoking unit.

FIG. 13 is an example of a sequence of the external program invoking unit. The external program invoking unit analyzes an NC program (Sa1) and determines whether the NC program is external program invocation (Sa2). When the NC program is the external program invocation (YES), the external program invoking unit determines whether the NC program corresponds to a connection destination number of the setting information (Sa3). When the NC program corresponds to the connection destination number of the setting information (YES), the external program invoking unit passes the setting information to the NC program acquisition determining unit (Sa4).

Figure 14:
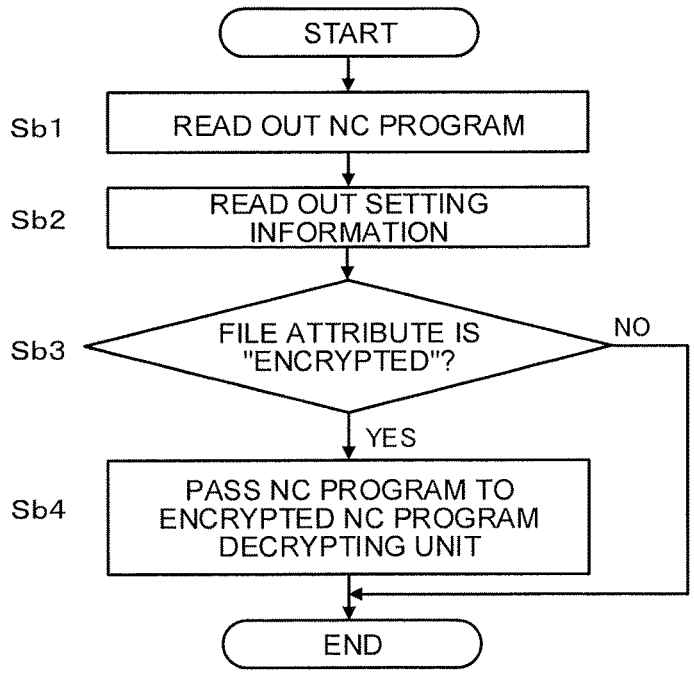
FIG. 14 is a diagram showing a sequence of an NC program decryption determining unit.

FIG. 14 is an example of a sequence of the encrypted NC program decryption determining unit. The encrypted NC program decryption determining unit reads out an NC program (Sb1), reads out setting information (Sb2), and determines whether a file attribute is "encrypted" (Sb3). When the file attribute is "encrypted" (YES), the encrypted NC program decryption determining unit passes the NC program to the encrypted NC program decrypting unit (Sb4).

Figure 15:
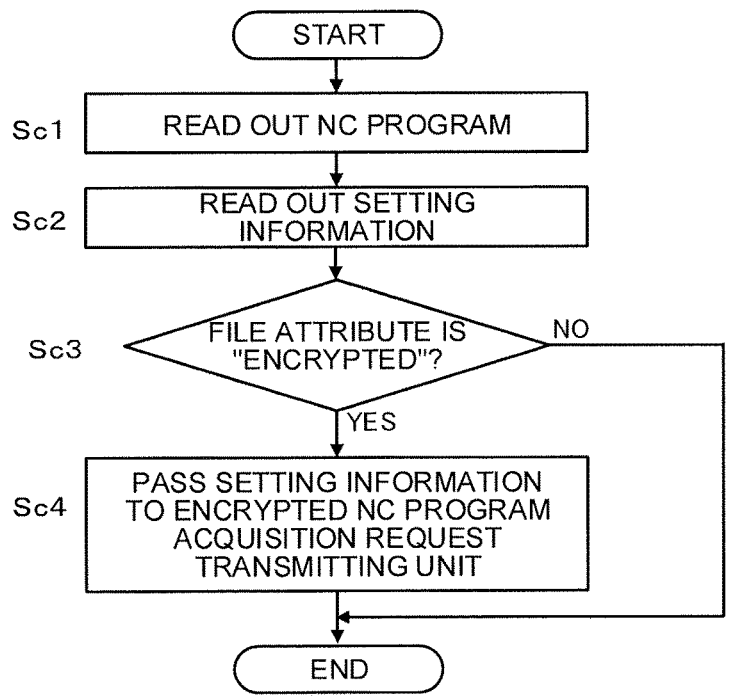
FIG. 15 is a diagram showing a sequence of an NC program acquisition determining unit.

FIG. 15 is an example of a sequence of the NC program acquisition determining unit. The NC program acquisition determining unit reads out an NC program (Sc1), reads out setting information (Sc2), and determines whether a file attribute is "encrypted" (Sc3). When the file attribute is "encrypted" (YES), the NC program acquisition determining unit passes the setting information to the encrypted NC program acquisition request transmitting unit (Sc4).

Figure 16:
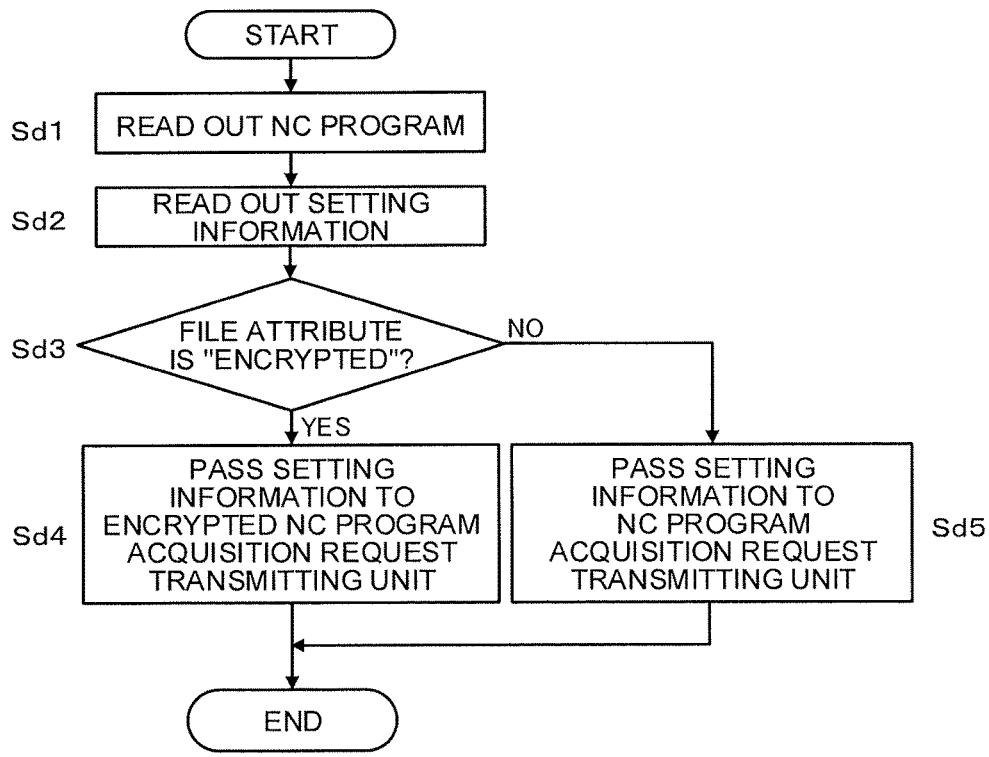
FIG. 16 is a diagram showing a sequence of the NC program acquisition determining unit.

FIG. 16 is an example of a sequence of the NC program acquisition determining unit. The NC program acquisition determining unit reads out an NC program (Sd1), reads out setting information (Sd2), and determines whether a file attribute is "encrypted" (Sd3). When the file attribute is "encrypted" (YES), the NC program acquisition determining unit passes the setting information to the encrypted NC program acquisition request transmitting unit (Sd4). When the file attribute is not "encrypted" (NO), the NC program acquisition determining unit passes the setting information to the NC program acquisition request transmitting unit (Sd5).

Figure 17:
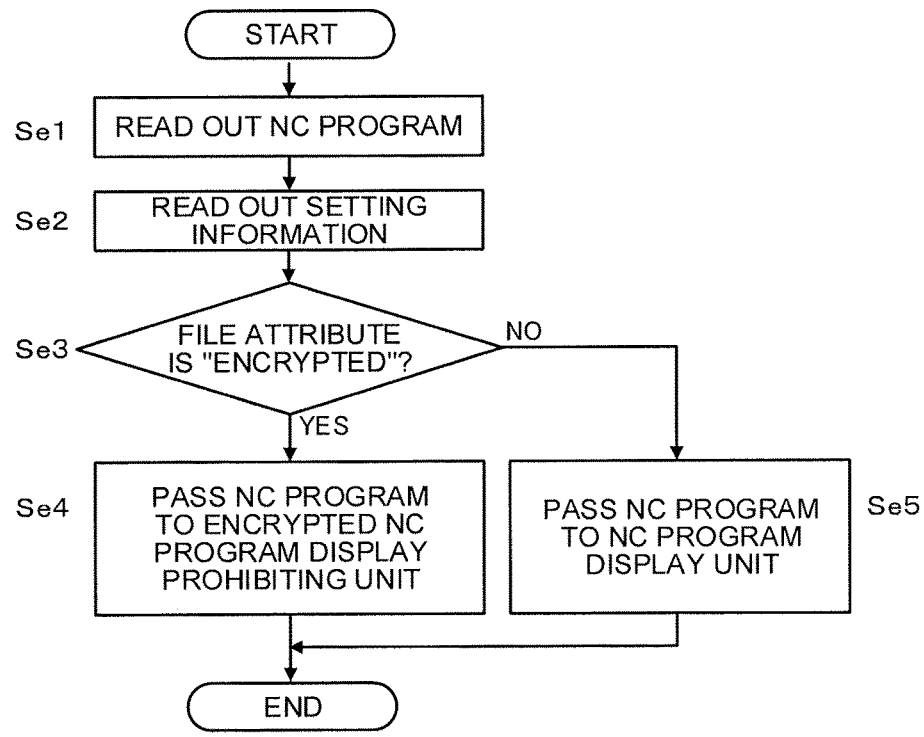
FIG. 17 is a diagram showing a sequence of an NC program display determining unit.

FIG. 17 is an example of a sequence of the NC program display determining unit. The NC program display determining unit reads out an NC program (Se1), reads out setting information (Se2), and determines whether a file attribute is "encrypted" (Se3). When the file attribute is "encrypted" (YES), the NC program display determining unit passes the NC program to the NC program display prohibiting unit (Se4). When the file attribute is not "encrypted" (NO), the NC program display determining unit passes the NC program to the NC program display unit (Se5).

Figure 18:
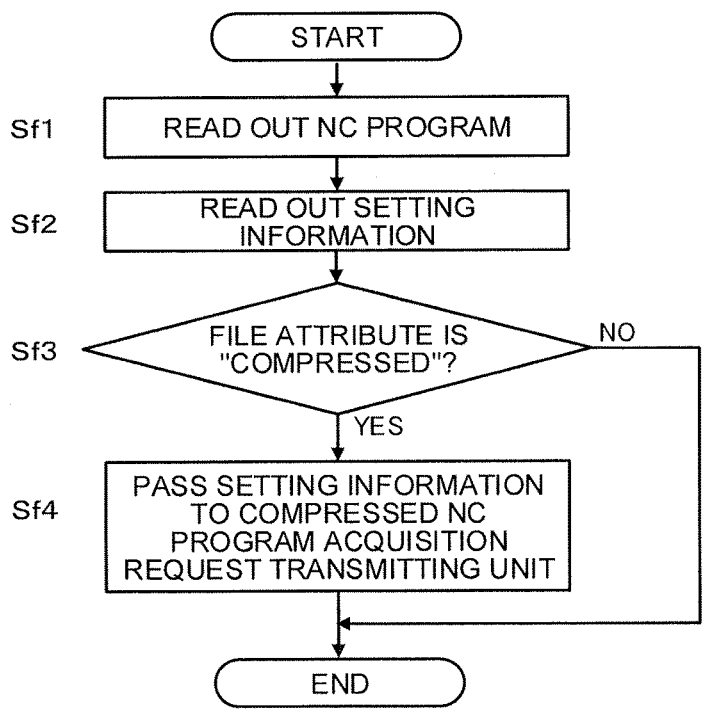
FIG. 18 is a diagram showing a sequence of the NC program acquisition determining unit.

FIG. 18 is an example of a sequence of the NC program acquisition determining unit. The NC program acquisition determining unit reads out an NC program (Sf1), reads out setting information (Sf2), and determines whether a file attribute is "compressed" (Sf3). When the file attribute is "compressed" (YES), the NC program acquisition determining unit passes the setting information to the compressed NC program acquisition request transmitting unit (Sf4).

Figure 19:
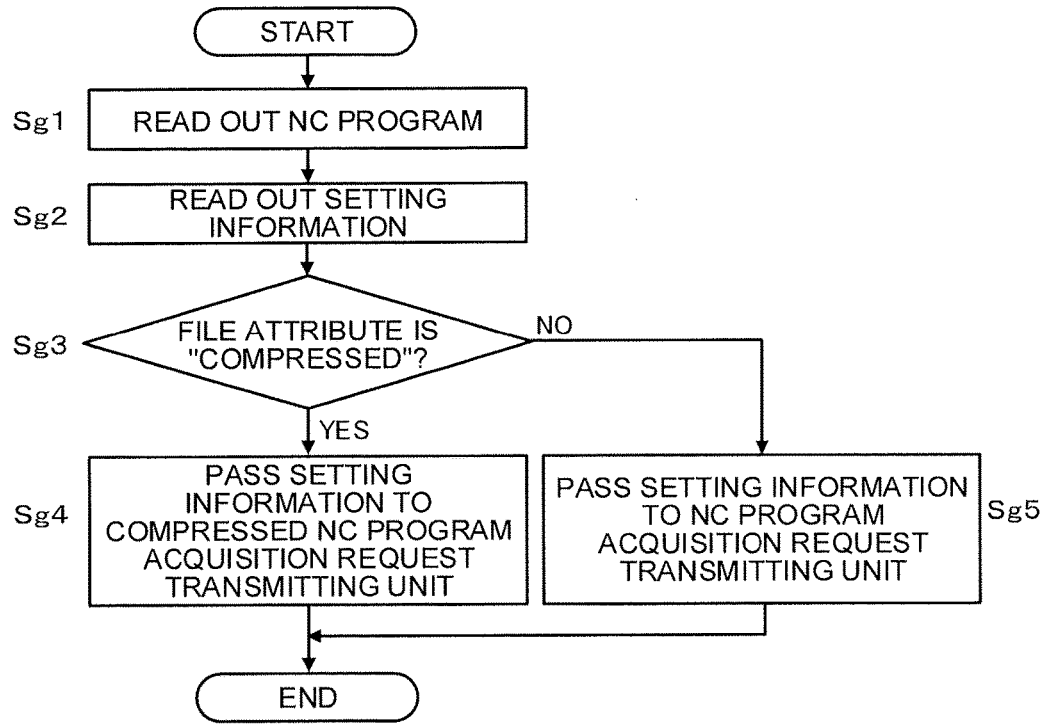
FIG. 19 is a diagram showing a sequence of the NC program acquisition determining unit.

FIG. 19 is an example of a sequence of the NC program acquisition determining unit. The NC program acquisition determining unit reads out an NC program (Sg1), reads out setting information (Sg2), and determines whether a file attribute is "compressed" (Sg3). When the file attribute is "compressed" (YES), the NC program acquisition determining unit passes the setting information to the compressed NC program acquisition request transmitting unit (Sg4). When the file attribute is not "compressed" (NO), the NC program acquisition determining unit passes the setting information to the NC program acquisition request transmitting unit (Sg5).

Figure 20:
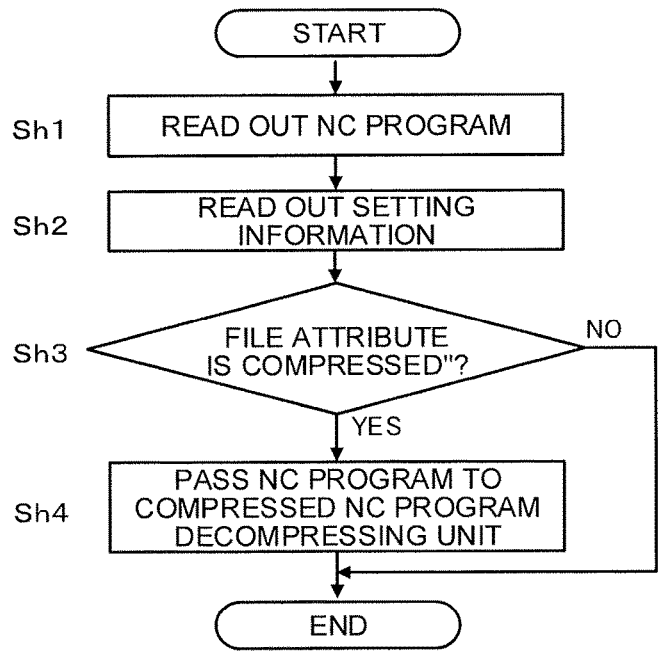
FIG. 20 is a diagram showing a sequence of a compressed NC program decompression determining unit.

FIG. 20 is an example of a sequence of the compressed NC program decompression determining unit. The compressed NC program decompression determining unit reads out an NC program (Sh1), reads out setting information (Sh2), and determines whether a file attribute is "compressed" (Sh3). When the file attribute is "compressed" (YES), the compressed NC program decompression determining unit passes the NC program to the compressed NC program decompressing unit (Sh4).

Figure 21:
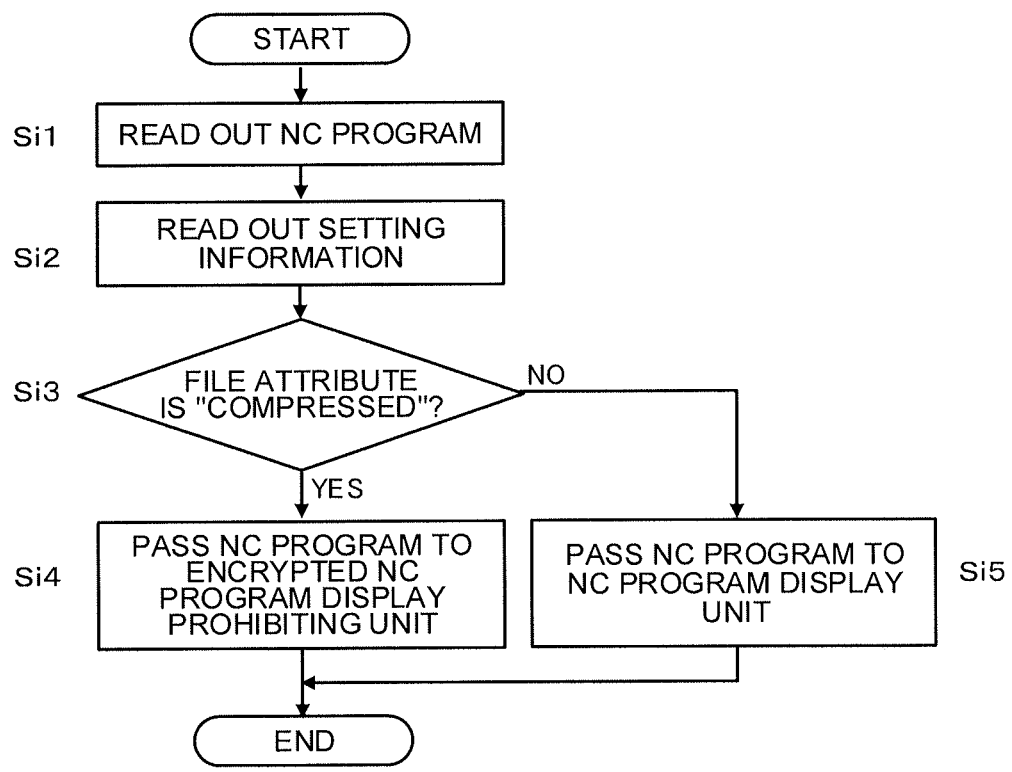
FIG. 21 is a diagram showing a sequence of the NC program display determining unit.

FIG. 21 is an example of a sequence of the NC program display determining unit. The NC program display determining unit reads out an NC program (Si1), reads out setting information (Si2), and determines whether a file attribute is "compressed" (Si3). When the file attribute is "compressed" (YES), the NC program display determining unit passes the NC program to the NC program display prohibiting unit (Si4). When the file attribute is not "compressed" (NO), the NC program display determining unit passes the NC program to the NC program display unit (Si5).

The embodiment shown in FIG. 1 is included in the inventions set forth in claims 1 to 3.

The embodiment shown in FIG. 2 is included in the inventions set forth in claims 4 to 6.

The embodiment shown in FIG. 3 is included in the invention set forth in claim 1.

The embodiment shown in FIG. 4 is included in the invention set forth in claim 2.

The embodiment shown in FIG. 5 is included in the inventions set forth in claims 1 and 2.

The embodiment shown in FIG. 6 is included in the invention set forth in claim 4.

The embodiment shown in FIG. 7 is included in the invention set forth in claim 5.

The embodiment shown in FIG. 8 is included in the inventions set forth in claims 4 and 5.

The embodiment shown in FIG. 13 is included in the inventions set forth in claims 1, 2, 4, and 5.

The embodiment shown in FIGS. 14, 16, and 17 is included in the invention set forth in claim 2.

The embodiment shown in FIG. 15 is included in the invention set forth in claim 1.

The embodiment shown in FIG. 18 is included in the invention set forth in claim 4.

The embodiment shown in FIGS. 19, 20, and 21 is included in the invention set forth in claim 5.

What is claimed is:

1. A numerical control (NC) device configured to control a machine tool while sequentially reading out an NC program from a host computer via a network line, the numerical control device comprising:
   an external program invoking unit configured to invoke an encrypted NC program as an external program;
   a communication setting information storing unit configured to store setting information for communicating with the host computer;

an NC program acquisition determining unit configured to determine, on the basis of the setting information stored in the communication setting information storing unit, whether the encrypted NC program needs to be acquired;

an encrypted NC program acquisition request transmitting unit configured to transmit an acquisition request for the encrypted NC program to the host computer;

an encrypted NC program decrypting unit configured to decrypt the encrypted NC program received from the host computer; and an NC program display prohibiting unit configured to prohibit display of the encrypted NC program.

2. A numerical control (NC) device configured to control a machine tool while sequentially reading out an NC program from a host computer via a network line, the numerical control device comprising:

an external program invoking unit configured to invoke an encrypted NC program and an unencrypted NC program as an external program;

a communication setting information storing unit configured to store setting information for communicating with the host computer;

an NC program acquisition determining unit configured to determine, on the basis of the setting information stored in the communication setting information storing unit, which one of the encrypted NC program and the unencrypted NC program needs to be acquired;

an encrypted NC program acquisition request transmitting unit configured to transmit, when the NC program acquisition determining unit determines that the encrypted NC program needs to be acquired, an acquisition request for the encrypted NC program to the host computer;

an NC program acquisition request transmitting unit configured to transmit, when the NC program acquisition determining unit determines that the unencrypted NC program needs to be acquired, an acquisition request for the unencrypted NC program to the host computer;

an NC program decryption determining unit configured to determine whether the NC program received from the host computer is the encrypted NC program;

an encrypted NC program decrypting unit configured to decrypt the NC program determined by the NC program decryption determining unit as being the encrypted NC program;

an NC program display determining unit configured to determine whether the encrypted NC program is displayed on an NC program display unit; and an NC program display prohibiting unit configured to prohibit display of the encrypted NC program.

3. The numerical control device according to claim 1, wherein the setting information stored in the communication setting information storing unit includes all or a part of a protocol, user information, a host name, a port number, a path, a file attribute indicating whether a file needs to be encrypted, and file information indicating a key necessary for decrypting the encrypted NC program.

4. A numerical control (NC) device configured to control a machine tool while sequentially reading out an NC program from a host computer via a network line, the numerical control device comprising:

an external program invoking unit configured to invoke a NC program compressed with a password as an external program;

a communication setting information storing unit configured to store setting information for communicating with the host computer;

an NC program acquisition determining unit configured to determine, on the basis of the setting information stored in the communication setting information storing unit, whether the NC program compressed with the password needs to be acquired;

a compressed NC program acquisition request transmitting unit configured to transmit to the host computer an acquisition request for the NC program compressed with the password;

a compressed NC program decompressing unit configured to decompress the NC program compressed with the password received from the host computer; and an NC program display prohibiting unit configured to prohibit display of the NC program compressed with the password.

5. A numerical control (NC) device configured to control a machine tool while sequentially reading out an NC program from a host computer via a network line, the numerical control device comprising:

an external program invoking unit configured to invoke an NC program compressed with a password and an uncompressed NC program as an external program;

a communication setting information storing unit configured to store setting information for communicating with the host computer;

an NC program acquisition determining unit configured to determine, on the basis of the setting information stored in the communication setting information storing unit, which one of the NC program compressed with the password and the uncompressed NC program needs to be acquired;

a compressed NC program acquisition request transmitting unit configured to transmit, when the NC program acquisition determining unit determines that the NC program compressed with the password needs to be acquired, an acquisition request for the NC program compressed with the password to the host computer;

an NC program acquisition request transmitting unit configured to transmit, when the NC program acquisition determining unit determines that the uncompressed NC program needs to be acquired, an acquisition request for the uncompressed NC program to the host computer;

an NC program decompression determining unit configured to determine whether the NC program received from the host computer is the NC program compressed with the password;

a compressed NC program decompressing unit configured to decompress the NC program compressed with the password determined by the NC program decompression determining unit as being the NC program that needs to be decompressed;

an NC program display determining unit configured to determine whether the NC program compressed with the password is displayed on an NC program display unit; and an NC program display prohibiting unit configured to prohibit display of the NC program compressed with the password.

6. The numerical control device according to claim 4, wherein the setting information stored in the communication setting information storing unit includes all or a part of a protocol, user information, a host name, a port number, a path, a file attribute indicating whether a file needs to be compressed, and file information indicating the password necessary for decompressing the compressed NC program.

7. The numerical control device according to claim 2, wherein the setting information stored in the communication setting information storing unit includes all or a part of a protocol, user information, a host name, a port number, a path, a file attribute indicating whether a file needs to be encrypted, and file information indicating a key necessary for decrypting the encrypted NC program.

8. The numerical control device according to claim 5, wherein the setting information stored in the communication setting information storing unit includes all or a part of a protocol, user information, a host name, a port number, a path, a file attribute indicating whether a file needs to be compressed, and file information indicating the password necessary for decompressing the compressed NC program.

* * * * *